United States Patent
Radinger et al.

(10) Patent No.: US 7,329,203 B2
(45) Date of Patent: Feb. 12, 2008

(54) PLANET CARRIER FOR A GEARBOX

(75) Inventors: Norbert Radinger, Nürnberg (DE); Matthias Fick, Schnaittach (DE)

(73) Assignee: Schaeffler KG, Herzogenaurach (DE)

( * ) Notice: Subject to any disclaimer, the term of this patent is extended or adjusted under 35 U.S.C. 154(b) by 197 days.

(21) Appl. No.: 10/563,720

(22) PCT Filed: Jul. 10, 2004

(86) PCT No.: PCT/EP2004/007642

§ 371 (c)(1),
(2), (4) Date: Jan. 6, 2006

(87) PCT Pub. No.: WO2005/015057

PCT Pub. Date: Feb. 17, 2005

(65) Prior Publication Data
US 2006/0160653 A1    Jul. 20, 2006

(30) Foreign Application Priority Data
Jul. 25, 2003 (DE) .............................. 103 33 880

(51) Int. Cl.
*F16H 57/08* (2006.01)
(52) U.S. Cl. ............... 475/331; 475/311; 475/348; 29/893
(58) Field of Classification Search ................ 475/311, 475/331, 348; 29/893, 893.1, 893.2
See application file for complete search history.

(56) References Cited

U.S. PATENT DOCUMENTS 3,780,601 A * 12/1973 Dach et al. ............ 475/325
5,685,798 A    11/1997 Lutz et al.
7,223,198 B2 * 5/2007 Kimes et al. ............ 475/331
2003/0050146 A1 * 3/2003 Nishiji et al. ............ 475/331

FOREIGN PATENT DOCUMENTS

| DE | 21 24 009 | 6/1979 |
| DE | 43 02 844 | 7/1993 |
| DE | 195 44 197 | 6/1997 |
| GB | 2 294 308 | 4/1996 |
| JP | 2001/200897 | 7/2001 |
| JP | 2001/304350 | 10/2001 |
| JP | 2002/021946 | 1/2002 |

* cited by examiner

Primary Examiner—David D. Le
(74) Attorney, Agent, or Firm—Volpe and Koenig, PC

(57) ABSTRACT

A planet carrier (2) for a gearbox, especially an automatic or power shift gearbox, is provided, including at least one planet gear (4) which is connected to a sun gear and a rotor wheel. The planet carrier is embodied in two parts and is made in two bodies (11, 12) which are formed with a step-like shape and which are arranged one within the other. The internal diameter of the axially extending segments of the external body (11) is adapted to the external diameters of the internal body (12). The bodies are positioned in a precise manner in relation to each other during construction. The individual components can be produced in a simple manner by shaping the sheet steel in a non-cutting manner.

19 Claims, 4 Drawing Sheets

PLANET CARRIER FOR A GEARBOX

BACKGROUND

The invention relates to a planet carrier for a gearbox, especially an automatic transmission or a powershift gearbox, in which planet gears are mounted on pins and the planet gears engage a sun gear, which is arranged coaxial to the center axis of the planet gears, and an internal geared wheel. Furthermore, the planet carrier is provided with a plate body for clutch or brake plates.

Planetary gearboxes of this type are used primarily in automatic transmissions or powershift gearboxes. They comprise a central sun gear, an internal geared wheel arranged concentric to the sun gear, and several planet gears, which are arranged between the sun and the internal geared wheel. The rotational axes of the planet gears are aligned parallel to and axial spaced from the axes of the sun gear and the internal geared wheel, with the teeth of the planet gears being in constant engagement with the teeth of the sun gear or the internal geared wheel. The planet gears are mounted rotatably on a planet carrier. The planet carrier, sun gear, and internal geared wheel can be coupled to each other or to a stationary gearbox component for changing the gear transmission ratio, whereby the components coupled to each other are held to the same rpm or fixed so that they cannot rotate. The coupling of various components is generally implemented through brake or plate clutches.

Planet carriers for gearboxes are known, which comprise a one-piece or multiple-piece carrier flange for the planet gears and a rotationally symmetric cup-shaped part. Teeth for clutch plates or brake plates are typically formed on the cup-shaped part. Such a device is known from DE 195 44 197. Accordingly, the planet carrier is constructed from a support base and a support cover, which define two parallel, spaced support planes separated by spacer columns. The connection between the support base and the support cover is produced by a welded connection via radially outwardly directed flange plates formed on the open ends of the spacer columns. In this way, the flange plates are connected to each other by means of ring segments. It is further explained that the support base is to be produced as a cast or forged part, which leads to the fact that expensive finishing work must be performed on the support base in the region of the spacer columns. Additional disadvantages of this solution are high production costs of cast or forged parts, their high weight, and low strength in the region of edges.

Another configuration of a planet carrier is shown in German Patent publication DE 43 02 844. Here, the configuration involves a planet carrier comprising a planet carrier hub part and a side wall component, which are formed as extruded or sheet-pressed parts. The side wall component is a cup-shaped plate body, while the planet carrier hub part comprises a ring-shaped disk and a tubular projection. Both components are rotationally symmetric with the exception of impressions, which extend in the axial direction. The impressions extend from the base of the side wall component outwards in the axial direction and from the disk of the planet carrier hub part axially away from the ring-shaped projection. The shape of the axial impressions makes complicated processing steps necessary during the shaping process.

When the planet carrier is assembled, the two components are welded to each other in the region of the impressions. Here, it must be guaranteed that they are positioned exactly both in the axial and also in the radial and peripheral directions. This requires enormous accuracy in the formation of the impressions and complicated positioning and centering means in the production of the weld connection, which is counter to economical production of the planet carrier.

SUMMARY

The invention is based on the objective of avoiding these mentioned disadvantages and thus creating a weight-optimized planet carrier, whose individual parts can be produced economically and with high dimensional accuracy and can be joined without expensive positioning means.

According to the invention, this objective is met in that the planet carrier is constructed from a one-piece, step-shaped outer cup body, in which a similarly one-piece, step-shaped inner cup body is inserted. The inner and outer cup bodies each comprise a sleeve section, which is connected at one end by a radially inwardly extending ring-shaped disk to a sleeve, which transitions into a tubular projection over a radially inwardly extending base. The outer diameter of the sleeve section, the sleeve, and the tubular projection of the inner cup body are adapted to the corresponding inner diameters of the outer cup body. The axial extent of the sleeve section of the inner cup body is smaller than that of the sleeve section of the outer cup body and the sum of the axial lengths of the sleeve section and the sleeve of the inner cup body is greater than the extent of the sleeve section of the outer cup body, so that the sleeve sections of the outer and inner cup bodies are closed on the end when planet gears are arranged between the ring-shaped disks.

In addition, recesses are arranged in the sleeve section of the outer cup body and the sleeve of the inner cup body. Through these recesses, the planet gears are guided radially.

In a second advantageous configuration, the objective is met according to the invention in that the planet carrier for a gearbox is constructed from a one-piece, step-shaped outer cup body, in which a similarly one-piece, step-shaped inner cup body is inserted. The outer and inner cup bodies each comprise a ring-shaped disk. A sleeve, which transitions into a tubular projection over a radially inwardly extending base, connects to the radially inner edge of this disk. A sleeve section extending axially away from the sleeve attaches to the radially outer edge of the ring-shaped disk of the outer cup body. The outer diameter of the disk, the sleeve, and the tubular projection of the inner cup body are adapted to the inner diameters of the sleeve section, the sleeve, and the tubular projection of the outer cup body. The outer and inner cup bodies are configured and arranged axially one in the other, such that the tubular projection of the inner cup body lies at least partially within the tubular projection of the outer cup body, the sleeve of the inner cup body lies at least partially within the sleeve of the outer cup body, and the ring-shaped disk lies within the sleeve section. Furthermore, recesses are arranged in the sleeve section of the outer cup body and the sleeve of the inner cup body. Planet gears installed between the disks are guided radially through these recesses.

The arrangements described above enable a planet carrier according to the invention to be realized with a minimum number of parts, in which between the ring-shaped disks of the outer and inner cup bodies a ring-shaped hollow space for holding planet gears and a plate body attached to the end for clutch or brake plates. Through the recesses, the planet gears engage in the sleeve of the inner cup body or the sleeve section of the outer cup body and thus are in engagement with a sun gear, which is arranged coaxial to the planet carrier axis, or an internal geared wheel arranged coaxial to the sun gear. The tubular projection of the inner cup body is used for receiving a driveshaft, on which the sun gear is mounted rotatably. The sun gear is mounted so that it can rotate relative to the planet carrier by means of a thrust bearing. Through the configuration of the planet carrier from two rotationally symmetric or nearly rotationally symmetric cup bodies one inserted in the other, wherein the outer diameter of the axially extending components of the inner cup body are adapted to the inner diameters of the axially extending components of the outer cup body, the coincidence of the center axes of the two cup bodies is guaranteed using simple means and methods. The end flush sealing of the sleeve sections guarantees the axial positioning.

Advantageously, the sleeve section of the outer cup body is provided with external teeth for brake or clutch plates.

Furthermore, it is proposed that the base of the inner cup body is provided with a ring-shaped groove-like receptacle, in which a thrust bearing is arranged.

In other embodiments of the invention, the outer and/or inner cup body is produced through non-cutting shaping of steel sheet. Advantages of these embodiments are the high strength and the low weight, the simple production, and the high dimensional accuracy and quality of the components, whereby expensive finishing work can be eliminated.

Furthermore, it is provided that aligned bore holes in the ring-shaped disks of the outer and inner cup bodies are arranged for receiving pins, on which planet gears are mounted.

In another advantageous configuration of the invention, the sleeve sections of the outer and inner cup body are connected with a frictional fit in the overlapping area or the sleeve section of the outer cup body and the disk of the inner cup body. This prevents wandering of the cup bodies relative to each other in the axial and peripheral directions. In the first case, the wall thickness of the ring-shaped sections in the overlapping area can be smaller for the same load capacity and therefore an additional weight advantage is produced.

It is further provided that the sleeve sections of the outer and inner cup bodies are connected to each other at the ends with a ring-shaped weld. Alternatively, the sleeve sections can be provided with flanges and can be welded to each other in the peripheral direction in the area of the flanges.

For the second embodiment, it is likewise provided to use a ring-shaped weld to connect the ring-shaped disk of the inner cup body to the sleeve section of the outer cup body.

Through the ring-shaped weld connection, a fixed connection of high stability between the two cup bodies is produced, which prevents relative movements in the axial and peripheral directions of the two components.

Also proposed is that the weld connection between the outer and inner cup body is realized through a laser welding method.

In addition, the sleeve sections of the outer and inner cup bodies or the sleeve section of the outer cup body and the ring-shaped disk can be provided with positive fit means, which engage with each other.

This can be configured in the form of internal teeth in the sleeve section of the outer cup body and teeth engaging in these external teeth on the sleeve section of the inner cup body or on the ring-shaped disk of the inner cup body. Therefore, a positive lock is produced between the outer and inner cup bodies, which increases the stability against relative movements in the peripheral direction.

In another advantageous configuration of the invention, the outer and inner cup bodies are produced from case hardened steel and an inner ring of a rolling bearing or free-wheel, in the form of a hardened angled sleeve, overlaps the sleeve of the outer cup body and the two parts are connected with positive fit and/or frictional connections. Therefore, the material costs are minimized considerably.

In another embodiment of the invention, the inner surface of the tubular projection of the inner cup body is provided with serrated teeth. Therefore, a positive fit connection with a shaft can be produced.

BRIEF DESCRIPTION OF THE DRAWINGS

Additional features of the invention follow from the subsequent description and from the drawings, in which embodiments of the invention are shown in a simplified form. Shown are.

DETAILED DESCRIPTION OF THE PREFERRED EMBODIMENTS

Figure 1:
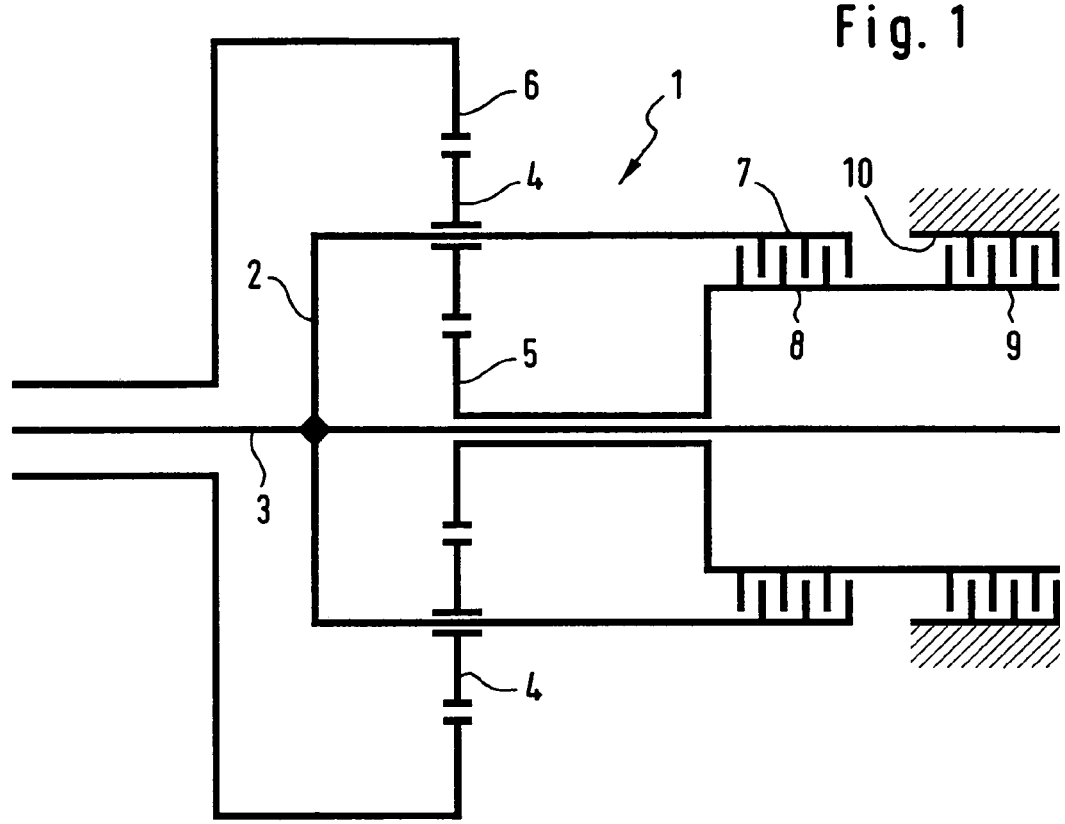
FIG. 1 a schematic representation of a planet gearbox.

As an exemplary embodiment of a planet carrier according to the invention, FIG. 1 shows a schematic representation of a planet gearbox 1, having a planet carrier is designated with 2. The planet carrier 2 is locked in rotation with a shaft 3 and is provided with planet gears 4 outside of its longitudinal axis. The rotational axis of the planet gears 4 lies parallel to the longitudinal axis of the planet carrier 2. A sun gear 5 and an internal geared wheel 6, which are in constant engagement with the planet gears 4, are arranged concentrically and rotatably on the planet carrier 2 or the shaft 3. The planet carrier 2 is provided with a first plate body 7. These components can be coupled by means of a second plate body 8, which is connected to the sun gear 5. With the help of a third plate body 9, which is connected to the sun gear 5, the sun gear can be braked by means of a housing-fixed fourth plate body 10.

Figure 2:
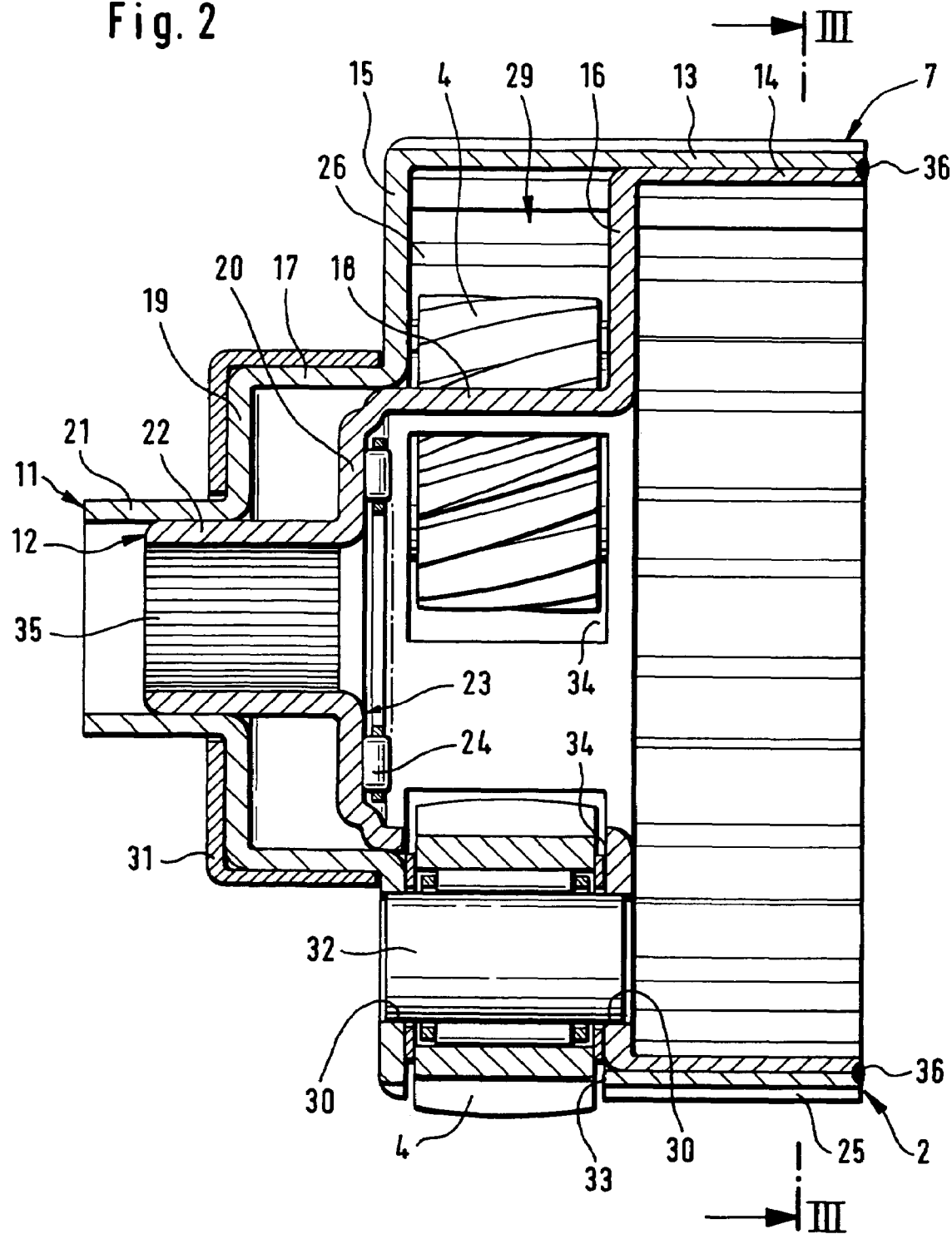
FIG. 2 a longitudinal section through a planet carrier according to the invention, FIG. 3 a cross section through a planet carrier according to the invention along line III-III from FIG. 2, FIG. 4 a longitudinal section through another embodiment of a planet carrier according to the invention, and FIG. 5 an exploded view of a planet carrier according to the invention from FIG. 4.

In FIG. 2, a planet carrier according to the invention, which comprises an outer cup body 11 and an inner cup body 12, is designated with 2. Both components have a one-piece, step-shaped construction. The outer and inner cup bodies each comprise a sleeve section 13 and 14, which are each connected to a respective ring-shaped sleeve 17 and 18 at one end by respective radially inwardly extending ring-shaped disks 15 and 16. These are each connected respectively to a tubular projection 21 and 22 by means of respective radially inwardly extending bases 19 and 20. The base 20 of the inner cup body 12 is provided with a ring-shaped, groove-like receptacle 23, in which a thrust bearing 24 is installed for supporting a not-shown sun gear. As shown in more detail, the outer cup body 11 and inner cup body 12 are dimensioned so that they can be arranged one inside the other. Here, the inner diameter of the sleeve section 13 is adapted to the outer diameter of the sleeve section 14. The advantage of this concept is that no centering measures are required for the components, because this is realized automatically through their shape and dimensions.

Furthermore, a frictional connection between the sleeve sections 13 and 14 is provided, whereby the wall thickness in the area of the overlapped sections can be selected to be smaller than in the other component, for the same carrying capacity of the component, and thus a reduction in weight is achieved.

Figure 3:
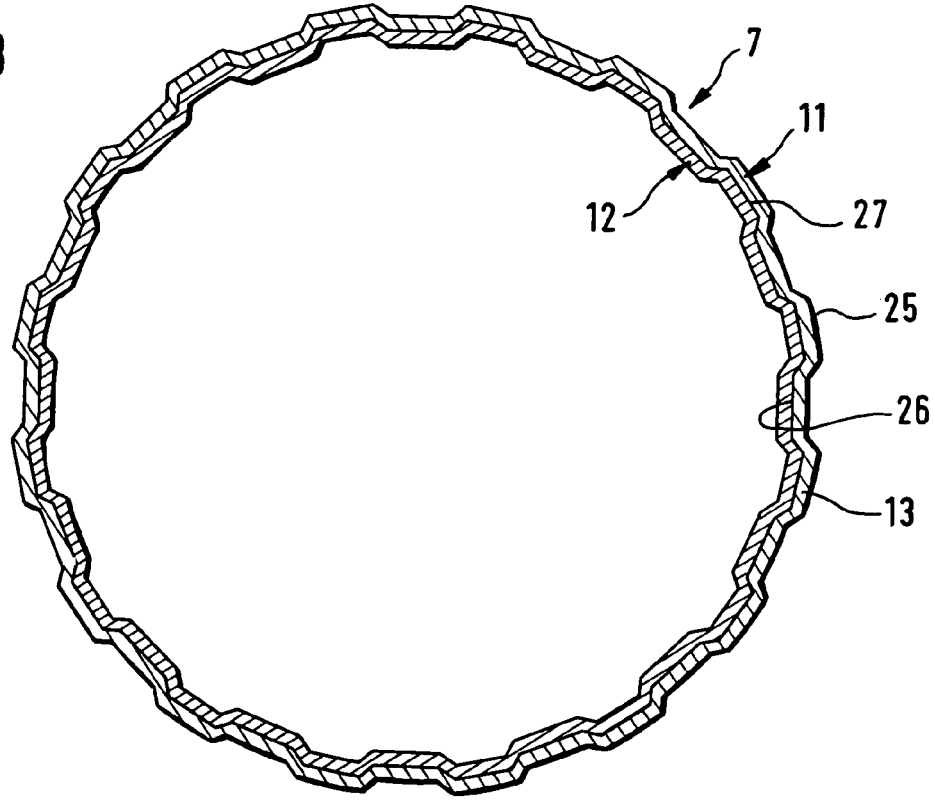

As can be seen from FIG. 3, external teeth 25, for the engagement of not-shown clutch or brake plates, and internal teeth 26 are formed as a wave-like profile or passage in the sleeve section 13 of the outer cup body 11. Furthermore, it can be recognized that first teeth 27 are likewise formed in the sleeve section 14 of the inner cup body 12, wherein these first teeth can also be realized as internal and external teeth or only as external teeth. The first teeth 27 are embodied, such that they engage with a positive fit in the internal teeth 26. This acts as an additional securing device against relative movement in the peripheral direction.

Furthermore, the invention provides that the two cup bodies are closed flush in the region of the sleeve sections 13 and 14 at the end in the axial direction and are coupled by means of a ring-shaped weld connection 36 at the end in order to prevent movements of the outer cup body 11 relative to the inner cup body 12. Furthermore, it is conceivable that the sleeve sections 13 and 14 closed flush on the end are provided with a flange at the end. The cup bodies 11 and 12 are welded to each other in a ring shape in the peripheral direction, in this case in the area of the flange.

The axial extent of the sleeve section 13 is greater than that of the sleeve section 14, whereby a ring-shaped hollow space 29 for receiving planet gears 4 is created. The hollow space 29 is defined in the radial direction by the sleeve section 13 and the sleeve 18 and in the axial direction by the parallel, opposing ring-shaped disks 15 and 16. In the disks 15 and 16, aligned bore holes 30 for receiving pins 32 are provided. The planet gears 4 are mounted on the pins. The pins 32 are force fit in the bore holes 30. Therefore, they are secured against movements both in the axial direction and also in the peripheral direction. The sleeve 18 and the sleeve section 13 are provided with recesses 33 and 34. These extend in the axial direction between the ring-shaped disks 15 and 16. The extent in the peripheral direction is held so that the planet gears 4 can rotate freely about the pins 32 and can engage through the recesses 33 and 34. Here, the teeth of the planet gears 4 are in continuous engagement with the teeth of a not shown internal geared wheel and a similarly not shown sun gear.

The axial extent of the sleeve 18 is selected so that it engages in the area of the sleeve 17, wherein the outer diameter of the sleeve 18 is adapted to the inner diameter of the sleeve 17. Therefore, the sleeve 17 is supported in the radial direction. In addition, the tubular projection 22 extends into the tubular projection 21, wherein the outer diameter of the projection 22 is similarly adapted to the inner diameter of the projection 21.

Both the inner and also outer cup bodies are produced in a deep drawing process from a case hardenable steel sheet through non-cutting shaping. With the exception of the bore holes 30, the individual components can be produced in a few processing steps. This permits economical production of the individual parts with simultaneous high dimensional accuracy. Furthermore, finishing work steps, especially in the area of the weld connection 36, can be eliminated.

The sleeve 17 of the outer cup body 11 is overlapped by an angled sleeve 31, which comprises hardened steel and whose outer surface is formed as the inner ring of a free-wheel, on which a not-shown internal geared wheel is arranged rotatably.

On the inner periphery of the tubular projection 22 there are serrated teeth 35, whereby a not-shown shaft can be actively connected to the planet carrier with a positive fit. Here, the shaft can be a driveshaft or a driven shaft.

Figure 4:
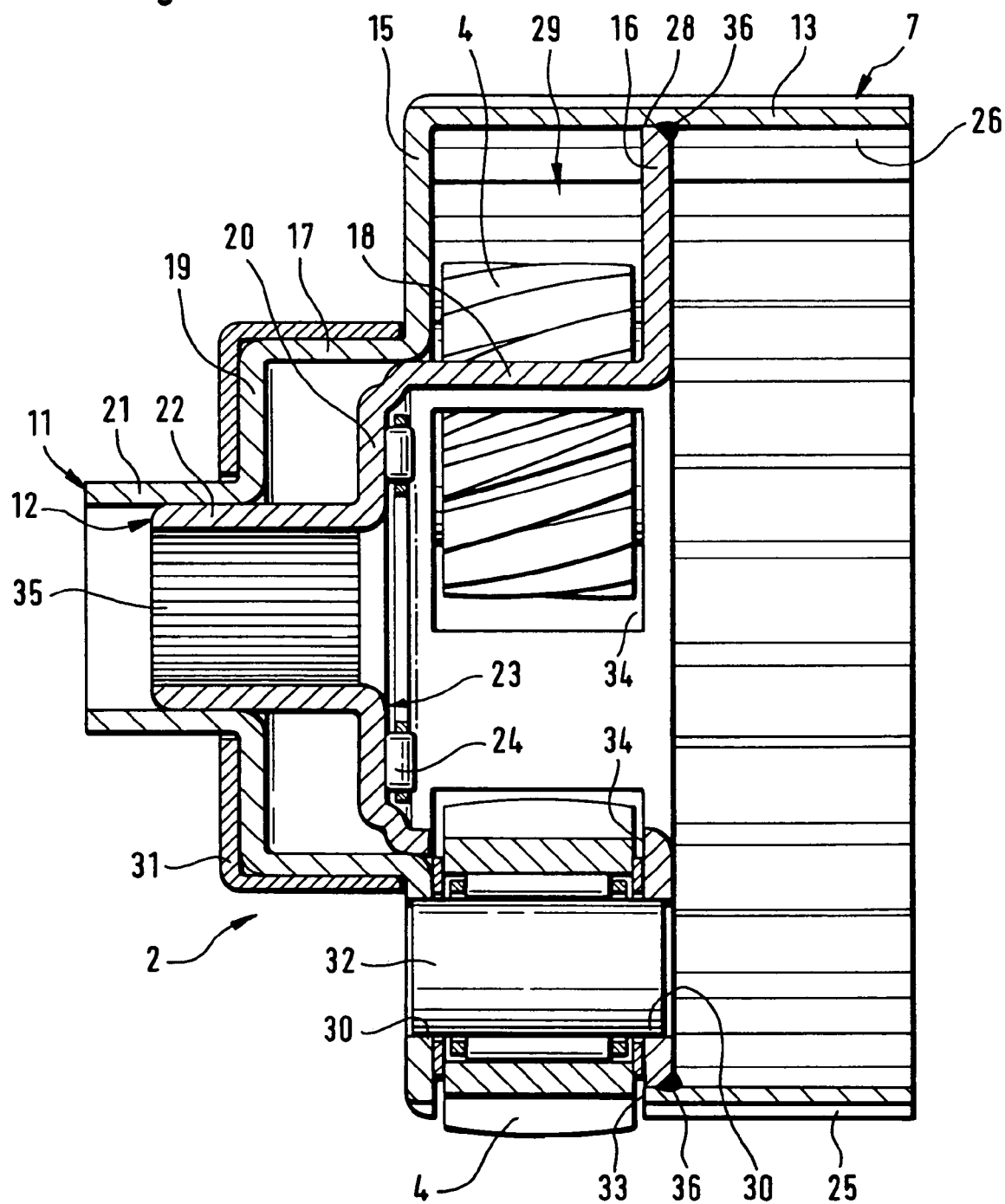
Figure 5:
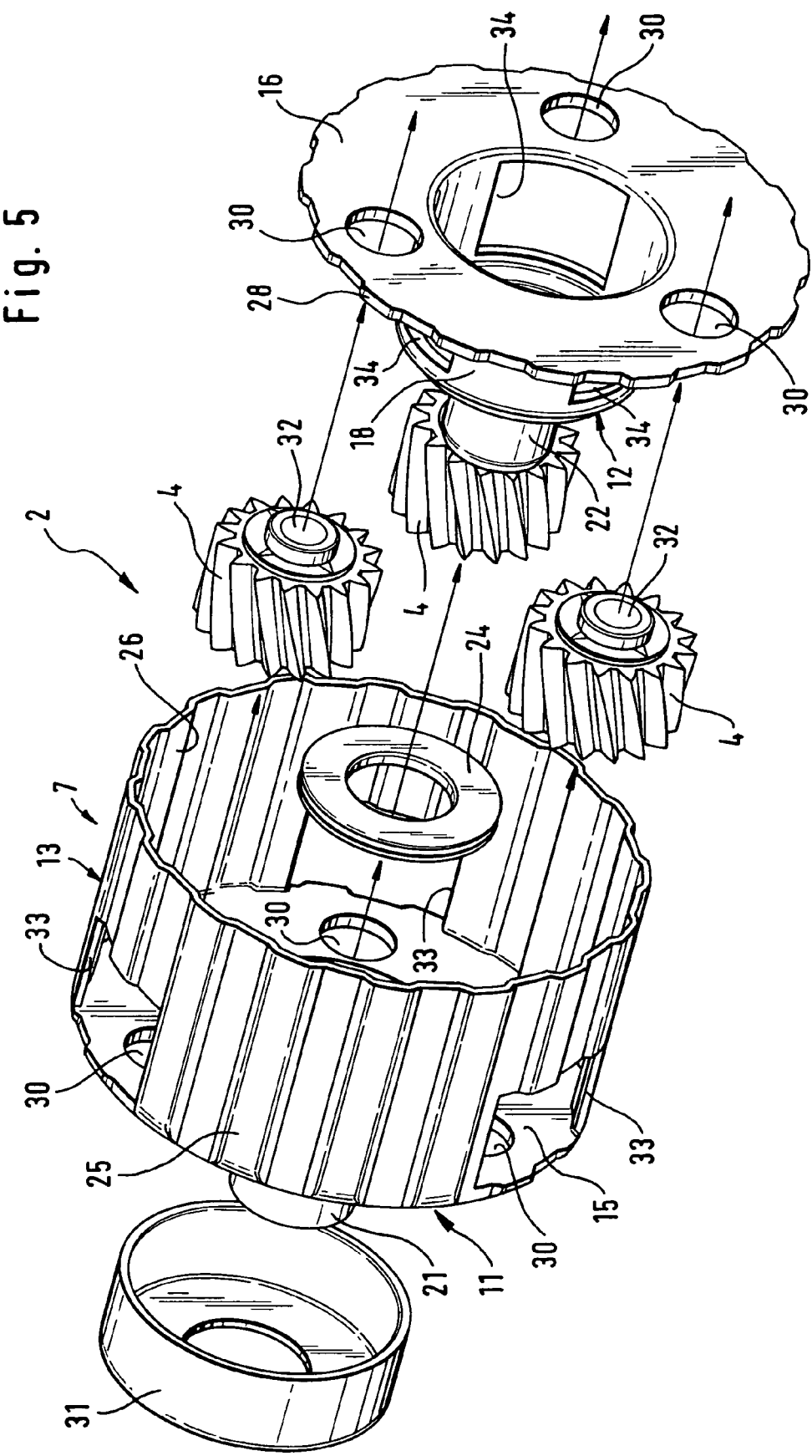

In FIG. 4 and FIG. 5, a second embodiment of a planet carrier according to the invention is shown. For the most part, this is identical in embodiment and function with that shown in FIG. 2 and FIG. 3, and the same reference numbers are used for identical parts. The difference between the two embodiments lies in the configuration of the inner cup body 12. In this embodiment, the inner cup body comprises a ring-shaped disk 16, on whose radially inner limit a sleeve 18 is connected, which transitions into a tubular projection 22 via a radially inwardly directed base 20. Thus, in comparison with the first embodiment, only the sleeve section 14 of the inner cup body 12 is missing. Second teeth 28 are formed on the outer limit of the ring-shaped disk 16. The inner cup body 12 is configured and arranged axially within the outer cup body 11 such that the tubular projection 22 of the inner cup body 12 lies at least partially within the tubular projection 21 of the outer cup body 11. Furthermore, the sleeve 18 of the inner cup body 12 lies at least partially within the sleeve 17 of the outer cup body 11 and the ring-shaped disk 16 within the sleeve section 13 of the outer cup body 11. In this way, the second teeth 28 engage with a positive and frictional fit in the internal teeth 26 of the outer cup body 11 and furthermore, can be secured against axial displacement or rotation in the peripheral direction by a ring-shaped weld connection 36.

Through the exact fit arrangement of the two nearly rotationally symmetric components in each other, expensive centering measures during assembly can be eliminated. The individual components can be produced lightweight and inexpensively and a lightweight construction is realized through the starting material in the form of sheet metal.

LIST OF REFERENCE SYMBOLS

1 Planet gearbox
2 Planet carrier
3 Shaft
4 Planet gear
5 Sun gear
6 Internal geared wheel
7 First plate body
8 Second plate body
9 Third plate body
10 Fourth plate body
11 Outer cup body
12 Inner cup body
13 Sleeve section
14 Sleeve section
15 Ring-shaped disk
16 Ring-shaped disk
17 Sleeve
18 Sleeve
19 Base
20 Base
21 Projection
22 Projection
23 Receptacle
24 Thrust bearing
25 External teeth
26 Internal teeth
27 First teeth
28 Second teeth
29 Hollow space
30 Bore hole
31 Angled sleeve 32 Pin
33 Recess
34 Recess
35 Serrated teeth
36 Weld connection

The invention claimed is:

1. Planet carrier for a gearbox comprising
a one-piece, step-shaped outer cup body, in which a similarly one-piece, step-shaped inner cup body is inserted,
wherein the outer and the inner cup bodies each comprise a sleeve section, which is connected at one end by a radially inwardly ring-shaped disk to a sleeve, which transitions into a tubular projection via a radially inwardly extending base,
wherein an outer diameter of the sleeve section, the sleeve, and the tubular projection of the inner cup body are adapted to corresponding inner diameters of the outer cup body,
wherein an axial extent of the sleeve section of the inner cup body is smaller than that of the sleeve section of the outer cup body and a sum of axial lengths of the sleeve section and the sleeve of the inner cup body is greater than that of the sleeve section of the outer cup body, so that the sleeve section of the outer and inner cup bodies are closed flush at the end when planet gears are arranged between the ring-shaped disks, and
wherein recesses are arranged in the sleeve section of the outer cup body and the sleeve of the inner cup body, wherein the planet gears are guided radially through the recesses.

2. Planet carrier for a gearbox according to claim 1, wherein the sleeve sections are respectively provided on one end with a flange and are welded to each other in a peripheral direction in an area of the flange.

3. Planet carrier for a gearbox according to claim 1, wherein the sleeve section of the outer cup body is provided with external teeth for clutch or brake plates.

4. Planet carrier for a gearbox according to claim 1, wherein the base of the inner cup body is provided with a ring-shaped, groove-like receptacle, in which a thrust bearing is installed.

5. Planet carrier for a gearbox according to claim 1, wherein the outer cup body is produced through non-cutting shaping of a steel sheet.

6. Planet carrier for a gearbox according to claim 1, wherein the inner cup body is produced through non-cutting shaping of a steel sheet.

7. Planet carrier for a gearbox according to claim 1, wherein aligned bore holes are arranged in the ring-shaped disks of the outer cup body and inner cup body for holding pins, on which the planet gears are mounted.

8. Planet carrier for a gearbox according to claim 1, wherein the sleeve sections of the outer and inner cup body are connected with a frictional fit in an overlapping area.

9. Planet carrier for a gearbox according to claim 1, wherein the outer and inner cup bodies are produced from case hardened steel and an inner ring of a rolling bearing or free-wheel, provided as a hardened angled sleeve, overlaps the sleeve of the outer cup body and the two parts are connected with a positive or frictional fit.

10. Planet carrier for a gearbox according to claim 1, wherein an inner surface of the tubular projection of the inner cup body is provided with serrated teeth.

11. Planet carrier for a gearbox according to claim 1, wherein the sleeve sections of the outer and inner cup body are connected to each other at one end with a ring-shaped weld.

12. Planet carrier for a gearbox according to claim 11, wherein the weld between the outer and inner cup bodies is a laser weld.

13. Planet carrier for a gearbox according to claim 1, wherein the sleeve section of the outer cup body and the sleeve section of the inner cup body are provided with a positive fit shape to engage one another.

14. Planet carrier for a gearbox according to claim 13, wherein the positive-fit shape is formed by internal teeth in the sleeve section of the outer cup body and first teeth in the sleeve section of the inner cup body.

15. Planet carrier for a gearbox comprising
a one-piece, step-shaped outer cup body, in which a similarly one-piece, step-shaped inner cup body is inserted, wherein the inner and the outer cup bodies each comprise a ring-shaped disk, on whose radially inner edge a sleeve is attached, which transitions into a tubular projection, via a radially inwardly extending base, wherein a sleeve section extending axially away from the sleeve is attached to a radially outer edge of the ring-shaped disk,
wherein an outer diameter of the disk, the sleeve, and the tubular projection of the inner cup body are adapted to inner diameters of the sleeve section, the sleeve, and the tubular projection of the outer cup body,
wherein the outer and inner cup bodies are configured and arranged axially one inside the other, such that the tubular projection of the inner cup body lies at least partially within the tubular projection of the outer cup body, the sleeve of the inner cup body lies at least partially within the sleeve of the outer cup body, and the ring-shaped disk lies within the sleeve section, and
wherein recesses are arranged in the sleeve section of the outer cup body and the sleeve of the inner cup body, wherein planet gears installed between the disks are guided radially through the recesses.

16. Planet carrier for a gearbox according to claim 15, wherein the sleeve section of the outer cup body is connected with a positive fit to the ring-shaped disk of the inner cup body.

17. Planet carrier for a gearbox according to claim 15, wherein the ring-shaped disk of the inner cup body is connected to the sleeve section of the outer cup body with a ring-shaped weld.

18. Planet carrier for a gearbox according to claim 15, wherein the sleeve section of the outer cup body and the ring-shaped disk of the inner cup body are provided with a positive-fit shape to engage one another.

19. Planet carrier for a gearbox according to claim 18, wherein the positive-fit shape is formed by internal teeth in the sleeve section of the outer cup body and second teeth on the ring-shaped disk of the inner cup body.

* * * * *